(12) United States Patent
Missotten et al.

(10) Patent No.: US 12,527,254 B2
(45) Date of Patent: Jan. 20, 2026

(54) CONTROL OF A CHOPPER ARRANGEMENT FOR AN AGRICULTURAL HARVESTER

(71) Applicant: CNH Industrial America LLC, New Holland, PA (US)

(72) Inventors: Bart M. A. Missotten, Herent (BE); Arno Leenknegt, Hooglede (BE); Jasper Vanlerberghe, Aartrijke (BE); Frederik Tallir, Esen (BE); Lucas Deruyter, Hooglede-Gits (BE); Luiz Henrique Di Creddo Palharin, São Paulo (BR); Yuanyuan Li, Leuven (BE)

(73) Assignee: CNH Industrial America LLC, New Holland, PA (US)

( * ) Notice: Subject to any disclaimer, the term of this patent is extended or adjusted under 35 U.S.C. 154(b) by 879 days.

(21) Appl. No.: 17/835,425

(22) Filed: Jun. 8, 2022

(65) Prior Publication Data

US 2022/0394921 A1 Dec. 15, 2022

(30) Foreign Application Priority Data

Jun. 9, 2021 (EP) .................................... 21178629

(51) Int. Cl.
*A01D 41/127* (2006.01)
*A01D 34/00* (2006.01)
(Continued)

(52) U.S. Cl.
CPC ......... *A01D 41/127* (2013.01); *A01D 34/008* (2013.01); *A01F 29/095* (2013.01); *A01F 12/40* (2013.01)

(58) Field of Classification Search
CPC .............. A01D 41/127; A01D 41/1243; A01D 34/008; A01F 29/095; A01F 29/04; A01F 12/40
See application file for complete search history.

(56) References Cited

U.S. PATENT DOCUMENTS

2016/0007537 A1 1/2016 Dilts et al.
2016/0088794 A1 3/2016 Baumgarten et al.
(Continued)

FOREIGN PATENT DOCUMENTS

EP 2225931 A1 * 9/2010 .......... A01D 43/085

OTHER PUBLICATIONS

Extended European Search Report for European Application No. 211 786 29.8, dated Dec. 2, 2021, 9 pages.

*Primary Examiner* — Michael J Zanelli
(74) *Attorney, Agent, or Firm* — Buchanan Ingersoll & Rooney PC

(57) ABSTRACT

A controller for controlling a chopper arrangement of an agricultural harvester. The controller receives sensor data indicative of an intensity of chopping performed on crop material by the chopper arrangement, and sensor data indicative of a power consumption of the chopper arrangement. The controller has a processor to determine an actuator setting for a chopper arrangement actuator of the agricultural harvester in dependence on the received sensor data indicative of the intensity of chopping and the received sensor data indicative of the power consumption. The controller sends an actuator control signal to the chopper arrangement actuator to control the chopper arrangement actuator to operate in accordance with the associated determined actuator setting. The determined actuator setting includes an amount of insertion, and an angle of insertion, of at least one bank of counter knives of the chopper arrangement relative to rotatable knife rows of the chopper arrangement.

16 Claims, 4 Drawing Sheets

(51) Int. Cl.
    *A01F 12/40*     (2006.01)
    *A01F 29/09*     (2010.01)

(56)     References Cited

U.S. PATENT DOCUMENTS

| | | | |
|---|---|---|---|
| 2017/0055445 A1* | 3/2017 | Mahieu | A01F 12/40 |
| 2018/0303030 A1 | 10/2018 | Heitmann et al. | |
| 2021/0015039 A1* | 1/2021 | Vandike | G06V 20/56 |
| 2021/0127578 A1* | 5/2021 | Desnijder | A01F 29/22 |
| 2022/0132742 A1* | 5/2022 | Faulkner | A01F 29/095 |
| | | | 460/112 |

\* cited by examiner

CONTROL OF A CHOPPER ARRANGEMENT FOR AN AGRICULTURAL HARVESTER

CROSS-REFERENCE TO RELATED APPLICATION

This application claims priority to European Patent Application No. 21178629.8, filed Jun. 9, 2021, the content of such application being incorporated by reference herein in its entirety.

TECHNICAL FIELD

The present invention relates to control of a chopper arrangement for an agricultural harvester and, in particular, to control of a degree and angle of insertion of counter knives of the chopper arrangement.

BACKGROUND

An agricultural harvester such as a combine harvester or 'combine' performs multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank on-board the combine. A cleaning fan blows air through the sieves to discharge chaff and other debris toward the rear of the combine. Non-grain crop material such as straw from the threshing section proceeds through a residue system, which may utilise a straw chopper to process the non-grain material and direct it out the rear of the combine. When the grain tank becomes full, the combine is positioned adjacent to a vehicle into which the grain is to be unloaded, such as a semi-trailer, gravity box, straight truck, or the like; and an unloading system on the combine is actuated to transfer the grain into the vehicle.

More particularly, a threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine through a chopper assembly or arrangement and discharged back to the field using a spreader system. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

After passing through the threshing and separating system, the coarse non-grain crop material can flow into the chopper arrangement to be cut into finer pieces before being thrown to a spreader to be spread on the field. Chopping the non-grain crop material into finer pieces increases the surface area of the crop material, allowing for quicker decomposition. One type of chopper arrangement that is commonly used has multiple moving knives—in particular, a plurality of knife rows disposed in a housing and rotating about an axis—that cooperate with stationary counter knives to chop the crop material into finer pieces. A shear bar can also be placed after the stationary counter knives to impede the flow of the crop material through the chopper arrangement and increase the chop quality or intensity.

In known chopper arrangements the bank or row of stationary counter knives can be moved relative to the housing to engage or disengage the counter knives with the rotating knives to perform different degrees of chopping of the crop material. In particular, the bank of counter knives may be inserted further into the housing to increase a degree of overlap between the counter knives and the rotating knives to increase a level of chopping performed on the crop material. On the other hand, the bank of counter knives may be retracted away from the rotating knives and out of the housing to decrease the degree of overlap between the counter knives and the rotating knives to reduce the level of chopping performed on the crop material, or to eliminate chopping completely.

The chopper arrangement on a combine harvester, such as the one described above, can take up a significant amount of power, for instance up to 30% of the power available to the harvester, which contributes to a significant amount of fuel consumption and can limit the capacity of the harvester. Also, the counter knives of known chopper arrangements can suffer from extensive wear, which can reduce the quality of chopping performed on crop material and necessitate expensive replacement of the counter knives.

It is against this background to which the present invention is set.

SUMMARY OF THE INVENTION

According to an aspect of the present invention there is provided a controller for controlling a chopper arrangement of an agricultural harvester. The controller comprises an input configured to receive sensor data indicative of an intensity of chopping performed on crop material by the chopper arrangement, and sensor data indicative of a power consumption of the chopper arrangement. The controller comprises a processor configured to determine an actuator setting for at least one chopper arrangement actuator of the agricultural harvester in dependence on the received sensor data indicative of the intensity of chopping and the received sensor data indicative of the power consumption. The controller comprises an output configured to send an actuator control signal to the at least one chopper arrangement actuator to control the at least one chopper arrangement actuator to operate in accordance with the associated determined actuator setting. The determined actuator setting includes an amount of insertion of at least one bank of counter knives of the chopper arrangement relative to a plurality of rotatable knife rows of the chopper arrangement, and an angle of insertion of the at least one bank of counter knives relative to the plurality of rotatable knife rows.

The processor may be configured to determine the actuator setting in dependence on the received sensor data indicative of the intensity of chopping relative to a required intensity of chopping.

The processor may be configured to determine the actuator setting to minimise power consumption of the chopper arrangement while obtaining chop intensity of the chopper arrangement at the required intensity of chopping.

The processor may be configured to determine the actuator setting to limit power consumption of the chopper arrangement relative to a maximum power consumption threshold.

The processor may be configured to determine the actuator setting to control the at least one chopper arrangement actuator to provide an optimal intensity of chopping relative to the required intensity of chopping without the maximum power consumption threshold being exceeded.

In some embodiments, if the processor is unable to determine the actuator setting of the at least one chopper arrangement actuator to achieve the required intensity of chopping then the output is configured to send a warning signal to an operator of the agricultural harvester.

The input may be configured to receive sensor data indicative of harvesting conditions in which the agricultural harvester is operating. The processor may be configured to determine the required intensity of chopping, and/or the actuator setting, in dependence on the received sensor data indicative of harvesting conditions.

The required intensity of chopping may be set based on operator input.

The processor may be configured to access a database including a plurality of actuator settings and associated sensor data in order to determine the actuator setting. The processor may be configured to monitor the received sensor data indicative of intensity of chopping and power consumption after the at least one chopper arrangement actuator has been actuated to operate in accordance with the associated determined actuator setting. The processor may be configured to send the determined actuator setting and the monitored sensor data to the database in order to update the database as part of a training process. The database can be onboard of the agricultural harvester, on a remote location or in the cloud. The data processing and/or determination of the actuator settings can be done onboard of the agricultural harvester, but also partially or even completely, on a remote location or in the cloud.

The processor may be configured to determine an indication of an amount of wear of the plurality of rotatable knife rows and/or the banks of counter knives in dependence of the received sensor data indicative of the intensity of chopping and the received sensor data indicative of the power consumption, and optionally also in dependence of received sensor data indicative of the crop flow rate, the rotational speed of the rotating knife rows/chopper shaft and/or the insertion amount/angle of the counter knife banks. An indication of the amount of wear can be obtained by comparing these data with reference data recorded for known states of wear. Comparing can be done by looking up the data in a lookup table or by artificial intelligence, for example by training a neural network with data recorded for known states of wear. The output may be configured to output a warning signal to an operator of the agricultural harvester if the determined amount of wear is higher than a threshold amount of wear.

In some embodiments, the sensor data indicative of intensity of chopping includes data from an image sensor arranged to collect images of the crop material downstream of the chopper arrangement, wherein the processor is configured to perform classification processing on the collected image data from the image sensor to determine an intensity of chopping parameter, and the processor is configured to determine the actuator setting in dependence on the determined intensity of chopping parameter relative to a parameter value associated with the required intensity of chopping.

The actuator control signal may be sent to control a first chopper arrangement actuator to adjust the amount of insertion of the bank of counter knives in accordance with the determined actuator setting. The actuator control signal may be sent to control a second chopper arrangement actuator to adjust the angle of insertion of the bank of counter knives in accordance with the determined actuator setting.

In some embodiments, the sensor data indicative of the power consumption includes data indicative of at least one of: a torque of the chopper arrangement; a tension of a belt of the chopper arrangement; and, a degree of slip of the belt of the chopper arrangement.

According to another aspect of the present invention there is provided a method of controlling a chopper arrangement of an agricultural harvester. The method comprises receiving sensor data indicative of an intensity of chopping performed on crop material by the chopper arrangement, and receiving sensor data indicative of a power consumption of the chopper arrangement. The method comprises determining an actuator setting for at least one chopper arrangement actuator of the agricultural harvester in dependence on the received sensor data indicative of the intensity of chopping and the power consumption, the actuator setting including a degree of insertion, and an angle of insertion, of at least one bank of counter knives of the chopper arrangement relative to a plurality of rotatable knife rows of the chopper arrangement. The method comprises sending an actuator control signal to the at least one chopper arrangement actuator to control the at least one chopper arrangement actuator to operate in accordance with the associated determined actuator setting.

According to another aspect of the present invention there is provided a chopper arrangement for an agricultural harvester, the chopper arrangement being for performing chopping on crop material processed by the agricultural harvester. The chopper arrangement comprises a housing, and a plurality of rotatable knife rows in the housing, the plurality of rotatable knife rows being rotatable about an axis to move crop material in the housing. The chopper arrangement comprises a counter knife bank movable relative to the housing to adjust an insertion amount and an insertion angle of the counter knife bank into the rotatable knife rows. The counter knife bank comprises an insertion angle actuator to adjust the insertion angle independent of the insertion amount of the counter knife bank.

According to another aspect of the present invention there is provided an agricultural harvester comprising a controller as described above, or a chopper arrangement as described above.

BRIEF DESCRIPTION OF THE DRAWINGS

Embodiments of the invention will now be described, by way of example only, with reference to the accompanying drawings, in which.

DETAILED DESCRIPTION

Figure 1:
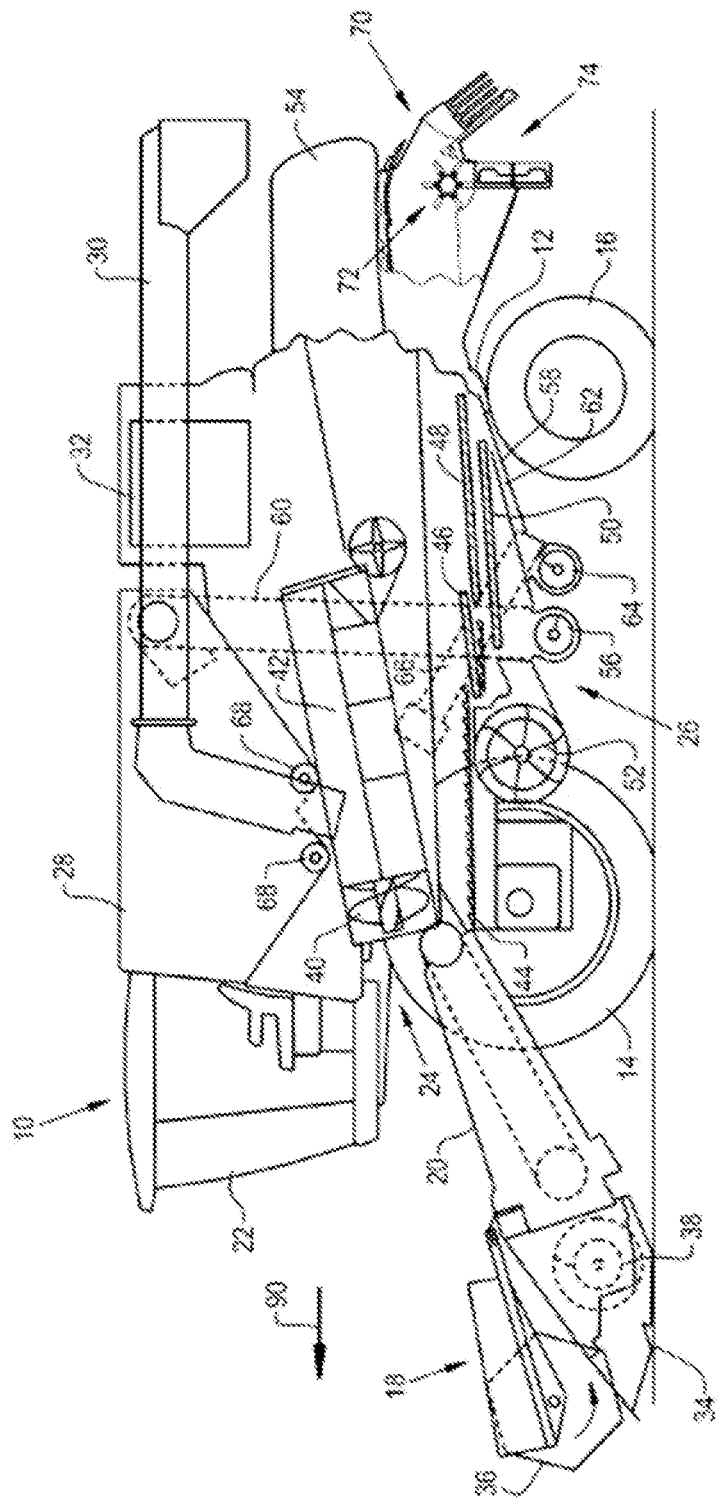
FIG. 1 is a side view of an agricultural harvester according to an aspect of the invention.

FIG. 1 shows an agricultural harvester in the form of a combine 10, which includes a chassis 12, ground engaging wheels 14, 16, a header 18, a feeder housing 20, an operator cab 22, a threshing and separating system or assembly 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are large flotation-type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, the combine may include tracks, such as full tracks or half-tracks.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable with a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating system 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48, 50 is subjected to a cleaning action by the fan, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-aft direction to transport the grain and finer non-grain crop material to the upper surface of the upper sieve 48. The upper sieve 48 and the lower sieve 50 are vertically arranged relative to each other, and likewise oscillate in a fore-aft direction to spread the grain across the sieves 48, 50 while permitting the passage of cleaned grain by gravity through the openings of the sieves 48, 50.

Clean grain falls to a clean grain auger 56 positioned crosswise below and in front of the lower sieve 50. The clean grain auger 50 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

A residue handling system 70 is integrated in the rear of the combine 10. More specifically, in the described example a chopper arrangement 72 of the residue handling system 70 is mounted to a straw hood 54 of the combine 10, and is located above a vertically-oriented straw and chaff spreader 74. It is noted that the residue handling system can be located at different positions within the combine, but is positioned such that it can receive material other than grain (MOG) after grain has been removed by the threshing and separating system. The residue spreader 74 can receive two streams of crop residue: one stream from the straw chopper 72 and one stream from the cleaning system 26. The residue spreader 74 discharges the non-grain crop material or residue across the harvested width behind the combine 10. A door can be located above the chopper 72 which can move to either divert residue to the chopper 72 and then to the spreader 74, or divert residue over the chopper 72 to the spreader 74 without chopping.

Figure 2:
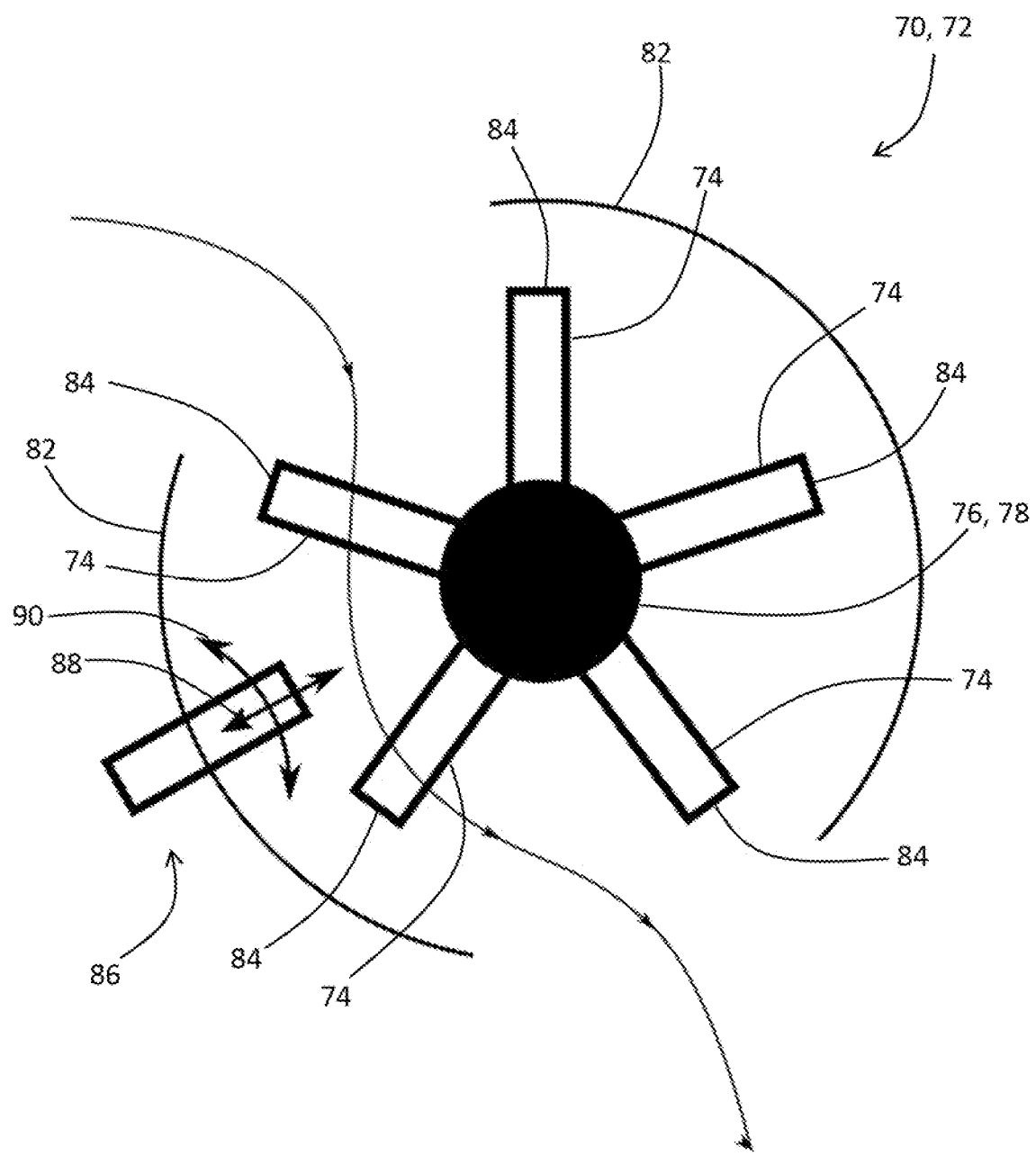
FIG. 2 is a side view of a chopper arrangement of the agricultural harvester of FIG. 1; and, FIG. 3 illustrates a controller of the agricultural harvester of FIG. 1 for controlling the chopper arrangement of FIG. 2, together with the inputs to, and outputs from, the controller; and, FIG. 4 shows the steps of a method performed by the controller of FIG. 3.

With additional reference to FIG. 2, the chopper arrangement 72 includes a number of knife rows 74 disposed, and equally spaced, about an axis 76 defined by a rotatable shaft 78, with each knife row 74 extending radially from the axis 76. In the described example, five knife rows 74 are shown; however, the chopper arrangement 72 may include any suitable number of knife rows 74. The knife rows 74 are rotatable about the axis 76. Each of the knife rows 74 includes outwardly-projecting knives along the length of the shaft 78.

The plurality of knife rows 74 and shaft 78 are disposed within a generally circular housing 82, having a radius centered at the axis 76 and a radius substantially equal to, or slightly greater than, a radius of curvature defined by the distal ends 84 of the plurality of knife rows 74 when the knife rows rotate about the axis 76. The housing 82 is arranged to receive crop material downstream of the threshing and separating system 24, and the rotation of the knife rows 74 causes the knives in the knife rows 74 to sweep or drag the crop material along a crop flow path and eventually towards an exit of the housing 82. The housing 82, shaft 78 and each of the plurality of knife rows 74 extend transversely relative to a driving direction—i.e. axial or front-to-rear direction—of the combine 10. As viewed in FIG. 2, the knife rows 74 rotate in an anti-clockwise direction to drag the crop material towards the housing exit generally in a direction indicated by the curved arrow passing through the interior of the housing 82.

The chopper arrangement 72 also includes a counter knife arrangement 86 adjacent to the housing 82. In particular, the counter knife arrangement 86 includes a bank of counter knives which, like the plurality of knife rows 74, extends transversely relative to the driving direction of the combine 10. The counter knife arrangement 86 is movable relative to the rest of the chopper arrangement 72 and, in particular, relative to the housing 82. In known arrangements, a bank of counter knives can be inserted into, or withdrawn from, the housing to respectively increase or decrease a degree or amount of engagement between the counter knives and the rotating knife rows in the housing. In particular, when the counter knife bank is inserted into the housing the counter knives intersect the rotating knife rows so as to engage with the knife rows and cause crop material being dragged by the rotating knife rows to be chopped. The further the counter knives are inserted into the rotating knife rows—i.e. the greater the amount engagement between the counter knives and rotating knives—the more intense the chopping performed on the crop material tends to be. In turn, however, this tends to increase the power consumption of the chopper arrangement, which can place limitations on other aspects of the operation of the combine, e.g. this can limit the ground speed at which the combine can operate.

It may also be described that the counter knives 86 overlap with the rotating knives 74. The term 'overlap' refers to the degree and angle of engagement of the counter knife bank 86 with the plurality of rotatable knife rows 74. In particular, the counter knives 86 can be inserted between the rotating knives 74 so that the counter knives 86 intersect the rotating knives 74. The degree to which the counter knives 86 are inserted into the rotating knives 74 determines the degree of overlap or engagement of the counter knives 86 with the rotating knives 74, and the angle formed between the counter knives 86 and the rotating knives 74 determines the angle of overlap or engagement of the counter knives 86 with the rotating knives 74.

In known arrangements, adjustment of the counter knife bank is along a single degree of freedom to engage or disengage the counter knives and the rotating knife rows. The direction of this single degree of freedom is predominantly linear movement into, or out of, the housing, although this movement may also involve some rotational movement of the counter knives relative to the housing. As such, the angle of insertion of the counter knives relative to the rotating knife banks is fixed for a given amount of insertion of the counter knives. By contrast, in the presently-described example the counter knife arrangement 86 has two degrees of freedom for movement or adjustment of the counter knives to engage with, or disengage from, the rotating knife rows. In particular, in addition to the degree to which the counter knives 86 are inserted into the housing 82—generally in a direction indicated by the arrow 88, the counter knife bank 86 is rotatable about its own axis relative to the housing 82—generally in a direction indicated by the arrow 90. Specifically, the substantially translational movement of the counter knife bank 86 in the arrow direction 88 is decoupled from the substantially rotational movement of the counter knife bank 86 in the arrow direction 90. That is, adjustment of the counter knife bank 86 in the substantially translational direction 88 can be performed independently from adjustment of the counter knife bank 86 in the substantially rotational direction 90. For instance, the counter knife arrangement 86 may be provided with separate actuators for performing adjustments along the different degrees of freedom 88, 90.

By providing a counter knife arrangement 86 that allows for the above-described different, independent manners of adjustment, both the amount or degree of insertion of the counter knives 86 relative to the housing 82 or rotating knife rows 74, and the angle of insertion of the counter knives 86 relative to the housing 82 or rotating knife rows 74, can be controlled.

The combine 10 includes a crop material camera sensor (not shown)—referred to as a 'chop cam'— in which real-time images of the crop material or residue downstream of the chopper arrangement 72 are taken and then analysed to determine an intensity of the chopped crop material. The camera—for instance, a near infrared camera (NIR)— may be located in any suitable location downstream of the chopper arrangement 72 so that images of the stream of chopped material exiting the chopper arrangement 72 may be obtained, for instance before the crop residue reaches the spreader 74. The camera may be part of a vision system including a flashlight that operates in conjunction with the camera to obtain images of the chopped crop residue. The intensity or quality of the chopped crop residue may be a measure of any suitable characteristics of the chopped material, for example a length, density, thickness, etc. of the chopped straw or chaff. Indeed, the measurement may include a scalar value or a distribution of the suitable characteristics.

The combine 10 may also include a number of other on-board harvester sensors for measuring data relating to various aspects of the combine's performance, in particular data indicative of one or more characteristics of the crop material downstream of the chopper arrangement 72. For instance, a feed-rate sensor may be located in proximity to the feeder 20 and measure the rate at which crop is being delivered from the feeder 20 to the rotors 40, an inclination sensor may measure the inclination of the combine 10 (and therefore a slope of the field being harvested), and yield and moisture sensors may be used to measure humidity of grain, straw and/or the atmosphere/air in the region/area being harvested. An engine load sensor may be used to measure a current load being placed on the engine 32 of the combine 10, where the load varies in dependence on many factors including the speed at which the combine 10 is travelling (ground speed). Further sensors that may be used to collect data indicative of characteristics of the chopped crop residue include a sensor measuring a width of ground being harvested, a sensor measuring a power being used by the rotors 40, a sensor arranged to provide an indication of a relative position of the combine 10 in the field, and a sensor arranged to detect a cutting height of the crop. The sensors can include radar, lidar or further vision sensors looking ahead of the combine 10 to acquire information from ahead of the combine 10. The crop material camera sensor may be the only sensor used to detect characteristics of the chopped crop residue. Alternatively, one or more of the other sensors mentioned here may be used in conjunction with, or instead of, the crop material camera sensor for this purpose.

The combine 10 also includes one or more sensors for measuring an indication of the power being consumed by the chopper arrangement 72. For instance, the combine 10 may include a torque sensor, or a sensor for measuring the tension and/or slip in a belt associated with the chopper arrangement 72. One or more suitable sensors may be used to provide an absolute and/or relative measure of power consumption of the chopper 72. As mentioned, the chopper arrangement 72 consumes a significant amount of the power available to the combine 10 provided by the engine 32, e.g. a third of the available power.

Figure 3:
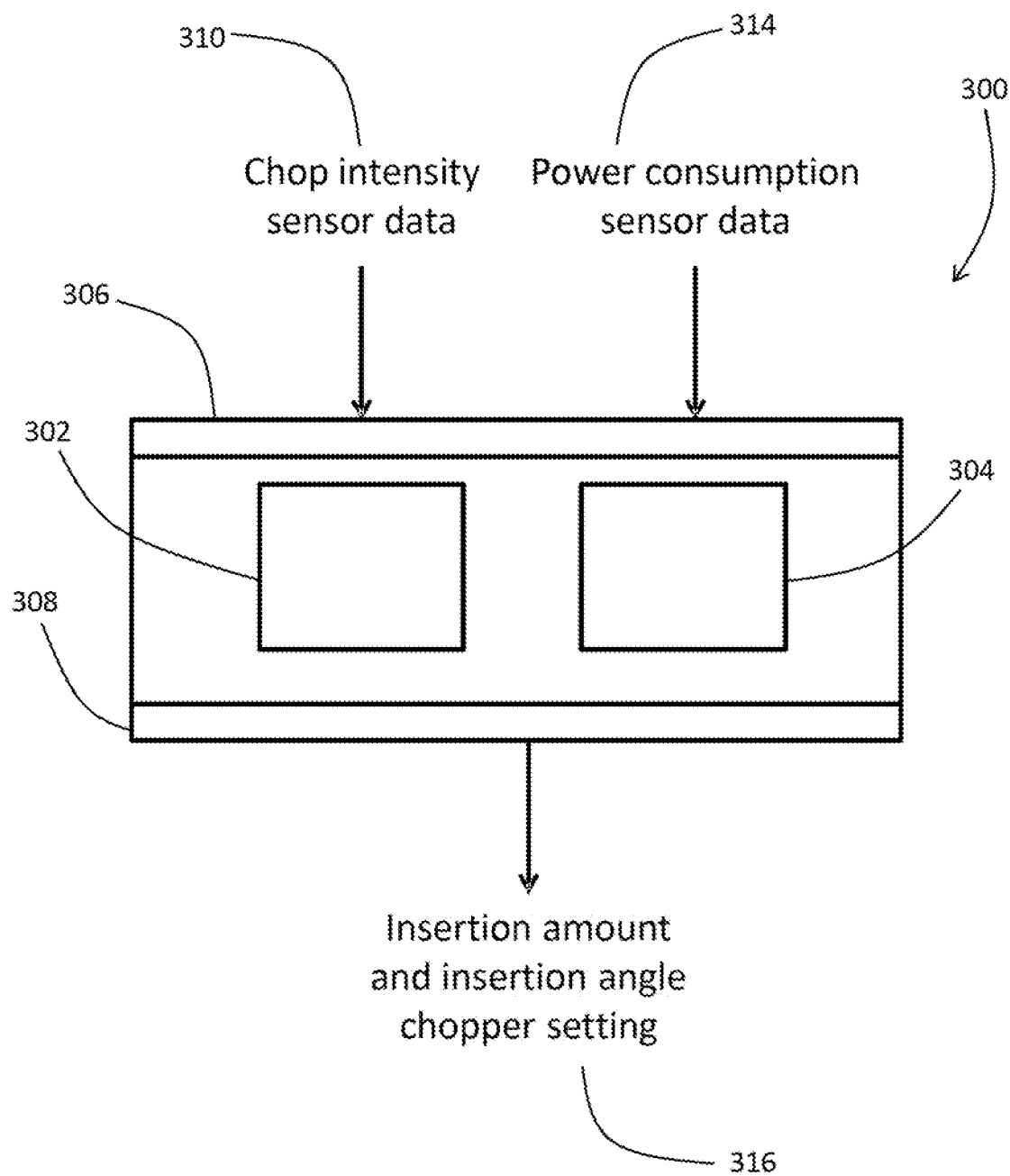

FIG. 3 shows a schematic view of the controller 300 located on-board the combine 10. In particular, the controller 300 includes one or more processors 302 and a memory device 304, together with an input 306 for receiving various electronic signals, and an output 308 for transmitting various electronic signals. The controller 300 may be provided by suitable software running on any suitable computing device using conventional or customer processors and memory. The controller 300 may use a single (common) computing device (for example, the controller's processes may run on a single server) or different device, or the controller 300 may be distributed between multiple computing devices.

The input 306 receives sensor output data 310 from each of the on-board harvester sensors mentioned above that provide an indication of characteristics of the chopped crop residue downstream of the chopper arrangement 72. The input 306 also receives data indicative of a required or desired chop intensity of the crop residue. For instance, the required or desired chop intensity may be set by an operator of the combine 10 via an operator input device, e.g. a human-machine interface, in the driver's cab 22 of the combine 10. Alternatively, the required chop intensity may be set based on the particular harvesting conditions in which the combine 10 is operating. In such a case, the data indicative of a required chop intensity parameter value may include sensor output data from one or more sensors and/or operator input providing data indicative of, for example, the weather conditions, the type of soil being harvested, the slope of the field being harvested, the type of crop being harvested and the location of the combine, for example via a GPS sensor, in combination with data gathered during previous harvesting and/or other field operations.

The input 306 also receives data 314 indicative of the power being consumed by the chopper arrangement 72, for example by means of a sensor input or data indicative of engine power being provided to the chopper arrangement 72. In addition, the input 306 may receive an indication of a chopper arrangement operational strategy to be followed by the combine 10. That is, the operator can select (via the operator input device) a particular strategy to be followed during harvesting. For instance, the strategy may involve maximising crop throughput using the power available to the combine 10. In particular, this may involve controlling the chopper arrangement 72 to achieve a required chop intensity of the chopped crop residue, and using the remaining engine power (subject to other power needs of the combine 10) to increase the ground speed of the combine 10 to thereby maximise crop throughput. This may optionally be when the combine 10 is at a maximum engine load. The operator can select a maximum engine load for the combine 10. A default load may be 100%. In uniform fields with good feeding of crop material into the crop processing system, it may be possible to drive the combine 10 at the limits of the available power without blocking the crop processing system, and a maximum engine load may be, for example, 110%. In contrast, in non-uniform fields with variable crop feeding, there may be an increased risk of rotor blockage at high engine loads and so the maximum engine load may be set to be somewhat lower than capacity, for example 90%. An alternative strategy to be followed during harvesting may involve minimising power consumption of the combine 10 while maintaining at least a minimum harvesting performance, e.g. controlling the ground speed of the combine 10 to maintain at least a minimum crop throughput.

Figure 4:
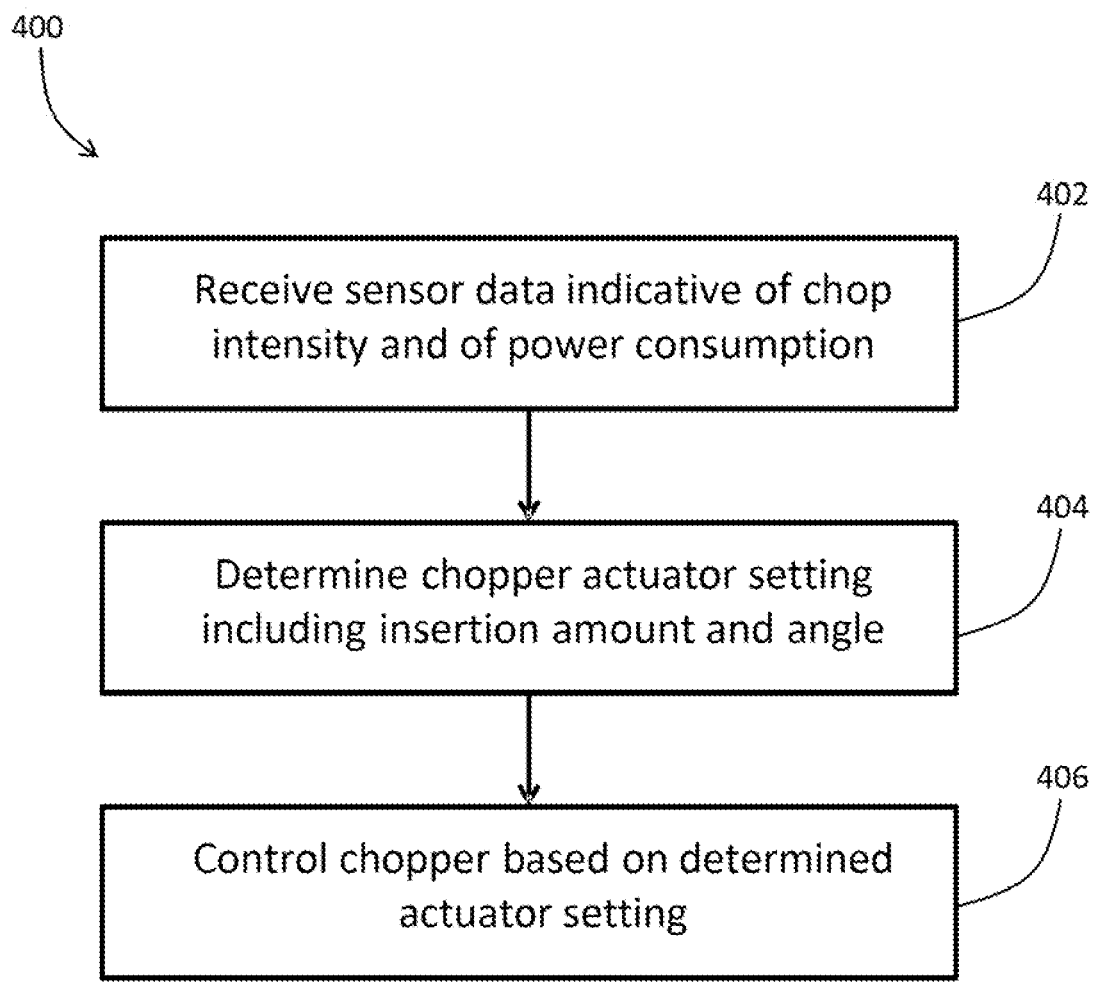

FIG. 4 shows the steps of a method 400 performed by the controller 300 of the combine 10. At step 402, the input 306 receives sensor output data indicative of one or more characteristics of crop material downstream of the chopper arrangement 72, e.g. the crop residue prior to it being thrown to the spreader 74. In the described example, the input 306 receives data from the camera sensor positioned downstream of the chopper arrangement 72. In particular, the sensor data includes image data of the chopped crop residue downstream of the chopper arrangement 72. Also, at step 402, the input 306 receives sensor output data indicative of a current amount of power consumption by the chopper arrangement 72 from one or more sensors on the combine 10, as mentioned above.

At step 404 the processor 302 determines actuator settings for the chopper arrangement 72 based on the sensor data received at step 402. In particular, actuator settings to control the position of the counter knife arrangement 86 relative to the housing 82 and rotating knife rows 74 are determined and, specifically, the amount and angle of insertion of the counter knives 86. The determination can be based on the current chop intensity of crop material (as indicated by the received sensor data) relative to required chop intensity thresholds. The determination can also be based on current power consumption relative to required power consumption thresholds. For instance, in one example the actuator settings are determined to minimise power consumption by the chopper 72 while the chopping intensity being performed by the chopper 72 is in accordance with a desired chopping intensity (as set manually or according to an operational strategy of the combine 10). In particular, the processor 302 may determine the required chop arrangement actuator settings for the determined or actual chop intensity to approach or become equal to the desired chop quality. There may be different combinations of insertion amount and insertion angle of the counter knives 86 that cause the actual chop intensity to approach the desired chop intensity. In this example, the combination that would result in the lowest power consumption by the chopper 72 would be selected by the processor 302. In another example, the actuator settings are determined so that the power consumption of the chopper 72 does not exceed a maximum permitted power consumption threshold while the chopping intensity performed by the chopper 72 is controlled to be as close to a desired chopping intensity as possible within the power consumption limits. Any suitable strategy may be followed to control both chop quality and power consumption by independently controlling the insertion amount and insertion angle of the counter knife bank 86.

In the non-limiting described example, in order to perform the chop intensity calculations the processor 302 determines a chop intensity parameter value to be associated with the crop residue at a given time during harvesting. In particular, the processor 302 uses the received sensor output data including the image data from the camera to make this determination. The determined chop intensity parameter value is indicative of an intensity of chopping performed on crop material by the chopper arrangement 72. In the described example, the processor 302 uses the received image data to categorise the chopped crop residue into one of a plurality of crop categories so as to determine the chop intensity parameter value. For instance, the processor 302 may perform a comparison between the image data received from the camera and image data stored in the memory device 304 of the controller 300 in order to categorise the chopped crop residue. It is to be understood that the processor 302 may use any suitable classification algorithm or method in order to categorise the received image data of the chopped crop residue. Indeed, different classification methods can be used to account for characteristics of the residue such as length and/or distribution of the particles or the texture of the image. For instance, the processor 302 may use classical image processing techniques such as normalisation of intensity or Hough analysis. These techniques may be used in conjunction with (e.g. pre-processing for) a machine learning algorithm—e.g. neural network algorithm—in order to classify a received image, or series of received images, to a particular chop intensity parameter value or category. Each different category may therefore correspond to a different chop intensity parameter value, where each category corresponds to crop residue having one or more different or distinguishable features. Purely by way of non-limiting example, five different categories—e.g. Category 1 to Category 5—may be provided in which chopped crop residue assigned a chop intensity parameter value associated with Category 1 is characterised by, inter alia, being of relatively short length, whereas Category 5 chopped crop residue is of relatively long length, the characteristic length (or range of lengths) of the chopped crop residue for each category increasing successively from Category 1 to Category 5. Note that different techniques, e.g. regression, may be used to determine chop quality of the crop material.

In order to determine the actuator settings based on the current chop quality and power consumption, the processor 302 may access the memory device 304, which may include a database of a plurality of actuator settings and associated sensor data.

At step 406 of the method 400, the controller 300 then sends, via the output 308, a control signal 316 to the one or more actuators to cause adjustment of the actuators in accordance with the determined required actuator settings. That is, the controller 300 sends one or more control signals to independently control the insertion amount and the insertion angle of the counter knife arrangement 86 in accordance with the settings determined based on the current chop quality and current power consumption.

It may be that in certain situations the required intensity of chopping cannot be achieved. For instance, one way of increasing the chopping intensity is to insert the one or more rows of counter knives of the chopper arrangement 72 further into the housing of the arrangement 72. However, if the knives become blunt or otherwise worn out then even when fully inserted the knives may not perform effective chopping such that the required chop intensity cannot be reached (for any insertion angle). More generally, it may be that the processor 302 cannot identify settings for the actuators that will result in the required chop intensity being achieved. In such a scenario, a warning signal may be generated and sent to the operator, e.g. via a display screen in the operator cab 22. The operator may then choose to adjust the required chop intensity, adjust one or more settings of the combine 10, e.g. maximum engine load, or check/adjust/replace components of the combine 10 contributing to the chop intensity, e.g. the rows of counter knives.

The controller 300 may be provided with a feedback loop that allows for self-learning or training over time as the controller acquires more data. For instance, the controller 300 can monitor how certain adjustments to the counter knife arrangement position affects different parameters, but particularly chop quality and power consumption. Specifically, the controller 300 can monitor changes over time caused by, for instance, the knives of the chopper becoming worn or blunt, meaning that the settings of the counter knife arrangement 86 may need to be updated over time in order to maintain the same harvesting performance. The controller 300 can therefore build a database of settings and associated collected or measured data to determine optimal settings for certain operating conditions and requirements, with the optimal settings possibly evolving over time. The combine 100 may be in wireless communication to off-board the combine 100 such that additional data or settings can be received by the controller 300, and/or optimal settings determined by the controller 300 can be transmitted off-board the combine 300 to, for instance, a 'global' database and/or to other harvesters.

Many modifications may be made to the above-described embodiment without departing from the scope of the appended claims.

In the above-described example the counter knife arrangement has a single bank of counter knives. In different examples, however, the counter knife arrangement may include two or more banks of counter knives for engagement with the rotatable knife rows.

In the above-described example the invention is described for an agricultural harvester having a rear/hood mounted chopper; however, it is to be understood that the invention is also applicable to other chopper arrangements, for instance an integral chopper located within the chassis of a combine.

In the above-described example, only the insertion amount and the insertion angle of the counter knife bank are adjusted in order to control chop intensity or quality of the crop material. However, it is to be understood that other parameters of the chopper arrangement may be adjusted in order to control chop intensity, such as the rotational speed of the rotating knife rows and chopper shaft, a position of a shred bar of the chopper relative to the rotating blades or knife rows, a speed and/or direction of crop material entering the chopper arrangement, and/or an amount of recirculation of crop material in the chopper arrangement, while noting that some of these parameters may be easier to control than others.

The present invention is advantageous in that, by providing a counter knife arrangement that has two independent or decoupled degrees of freedom in terms of adjustment relative the rest of a chopper arrangement, not only a chop intensity of crop material can be controlled, but also a power consumption of the chopper arrangement can be controlled. This is in contrast to known arrangements, in which a counter knife arrangement has a single degree of freedom of adjustability, meaning that adjustment of the counter knives may be used to control chop intensity, but power consumption would remain a completely dependent parameter in such a case in terms of counter knife bank control.

The present invention particularly provides a counter knife arrangement that can be adjusted independently in substantially linear and angular directions relative the rest of the chopper arrangement, which advantageously provides a relatively simple but effective way of having a degree of separate control over chop intensity and power consumption. In particular, it is noted that while other parameters of the chopper may be controlled to provide additional degrees of freedom, control of these other parameters may involve complex and/or expensive additional components of, or modifications to, the harvester, compared to the relatively inexpensive and simple arrangement of the present invention.

The present invention advantageously provides for automatic control of the counter knife arrangement in accordance with a desired operational strategy in changing operational conditions. For instance, in one example the invention advantageously provides for automatic adjustment of the counter knife arrangement to maintain a desired chop quality while minimising power consumption as the crop flow rate into the chopper changes. Beneficially, this means that an operator does not need to continually adjust settings manually to maintain desired or optimal performance, which in any case would be very complicated given that there are two independent variables—namely, insertion degree and angle—to control, which may have a complex inter-relationship.

The present invention is advantageous in that it allows for lower power consumption by the chopper arrangement which can then be used to increase the ground speed of the harvester in order to increase harvesting performance. By providing a controller that has a self-learning function, the invention is advantageous in that it can compensate for, e.g. knives or blades of the chopper becoming worn or blunt, by automatically adjusting the counter knife arrangement to maintain a desired operational performance.

What is claimed is:

1. A controller for controlling a chopper arrangement of an agricultural harvester, the controller comprising:
   an input configured to receive:
   (i) sensor data indicative of an intensity of chopping performed on crop material by the chopper arrangement; and, (ii) sensor data indicative of a power consumption of the chopper arrangement;

a processor configured to determine an actuator setting for at least one chopper arrangement actuator of the agricultural harvester in dependence on the received sensor data indicative of the intensity of chopping and the received sensor data indicative of the power consumption; and, an output configured to send an actuator control signal to the at least one chopper arrangement actuator to control the at least one chopper arrangement actuator to operate in accordance with the associated determined actuator setting, wherein the determined actuator setting includes:
(a) a first setting defining an amount of linear insertion of at least one bank of counter knives of the chopper arrangement relative to a plurality of rotatable knife rows of the chopper arrangement; and,
(b) a second setting defining an angle of insertion of the at least one bank of counter knives relative to the plurality of rotatable knife rows, wherein the first and second settings are independent from one another.

2. A controller according to claim 1, wherein the processor is configured to determine the actuator setting in dependence on the received sensor data indicative of the intensity of chopping relative to a required intensity of chopping.

3. A controller according to claim 2, wherein the processor is configured to determine the actuator setting to minimise power consumption of the chopper arrangement while obtaining chop intensity of the chopper arrangement at the required intensity of chopping.

4. A controller according to claim 2, wherein the processor is configured to determine the actuator setting to limit power consumption of the chopper arrangement relative to a maximum power consumption threshold.

5. A controller according to claim 4, wherein the processor is configured to determine the actuator setting to control the at least one chopper arrangement actuator to provide an optimal intensity of chopping relative to the required intensity of chopping without the maximum power consumption threshold being exceeded.

6. A controller according to claim 2, wherein if the processor is unable to determine the actuator setting of the at least one chopper arrangement actuator to achieve the required intensity of chopping then the output is configured to send a warning signal to an operator of the agricultural harvester.

7. A controller according to claim 2, wherein the input is configured to receive sensor data indicative of harvesting conditions in which the agricultural harvester is operating, and wherein the processor is configured to determine the required intensity of chopping, and/or the actuator setting, in dependence on the received sensor data indicative of harvesting conditions.

8. A controller according to claim 2, wherein the required intensity of chopping is set based on operator input.

9. A controller according to claim 1, wherein the processor is configured to access a database including a plurality of actuator settings and associated sensor data in order to determine the actuator setting, wherein the processor is configured to monitor the received sensor data indicative of intensity of chopping and power consumption after the at least one chopper arrangement actuator has been actuated to operate in accordance with the associated determined actuator setting, and wherein the processor is configured to send the determined actuator setting and the monitored sensor data to the database in order to update the database as part of a training process.

10. A controller according to claim 1, wherein the processor is configured to determine an indication of an amount of wear of the plurality of rotatable knife rows and/or the bank of counter knives in dependence on the received sensor data indicative of the intensity of chopping and the received sensor data indicative of the power consumption, and wherein the output is configured to output a warning signal to an operator of the agricultural harvester if the determined amount of wear is higher than a threshold amount of wear.

11. A controller according to claim 1, wherein the sensor data indicative of intensity of chopping includes data from an image sensor arranged to collect images of the crop material downstream of the chopper arrangement, wherein the processor is configured to perform classification processing on the collected image data from the image sensor to determine an intensity of chopping parameter, and the processor is configured to determine the actuator setting in dependence on the determined intensity of chopping parameter relative to a parameter value associated with the required intensity of chopping.

12. A controller according to claim 1, wherein the actuator control signal is sent to control a first chopper arrangement actuator to adjust the amount of linear insertion of the bank of counter knives in accordance with the determined actuator setting, and wherein the actuator control signal is sent to control a second chopper arrangement actuator to adjust the angle of insertion of the bank of counter knives in accordance with the determined actuator setting.

13. An agricultural harvester comprising the controller of claim 1.

14. A method of controlling a chopper arrangement of an agricultural harvester, the method comprising:
receiving sensor data indicative of an intensity of chopping performed on crop material by the chopper arrangement;
receiving sensor data indicative of a power consumption of the chopper arrangement;
determining an actuator setting for at least one chopper arrangement actuator of the agricultural harvester in dependence on the received sensor data indicative of the intensity of chopping and the power consumption, the actuator setting including a first setting defining a degree of linear insertion and a second setting defining an angle of insertion, of at least one bank of counter knives of the chopper arrangement relative to a plurality of rotatable knife rows of the chopper arrangement, wherein the first and second settings are independent from one another; and,
sending an actuator control signal to the at least one chopper arrangement actuator to control the at least one chopper arrangement actuator to operate in accordance with the associated determined actuator setting.

15. A chopper arrangement for an agricultural harvester, the chopper arrangement being configured for performing chopping on crop material processed by the agricultural harvester, the chopper arrangement comprising:
a housing;
a plurality of rotatable knife rows in the housing, the plurality of rotatable knife rows being rotatable about an axis to move crop material in the housing; and,
a bank of counter knives movable relative to the housing to adjust a linear insertion amount and an insertion angle of the bank of counter knives into the rotatable knife rows, wherein the bank of counter knives comprises (i) an insertion angle actuator that is configured to adjust the insertion angle independent of the linear insertion amount of the bank of counter knives, and (ii) a linear insertion actuator that is configured to adjust the linear insertion amount independent of the insertion angle of the bank of counter knives.

16. An agricultural harvester comprising the chopper arrangement of claim 15.

* * * * *